United States Patent [19]

Brekke

[11] 4,205,699
[45] Jun. 3, 1980

[54] FLUID DELIVERY APPARATUS

[76] Inventor: Carroll E. Brekke, 2229 Parkland Way, Petaluma, Calif. 94952

[21] Appl. No.: 865,030

[22] Filed: Dec. 28, 1977

[51] Int. Cl.² .................... F16L 3/00; F16L 27/00; B67D 5/04
[52] U.S. Cl. .................................. 137/615; 285/190; 141/279; 141/387
[58] Field of Search ............... 137/615; 141/387, 388, 141/279, 284, 100, 105; 285/272, 273, 274, 190; 248/289 R

[56] References Cited

U.S. PATENT DOCUMENTS

| | | | |
|---|---|---|---|
| 449,033 | 3/1891 | Bauers | 285/190 |
| 980,353 | 1/1911 | Smith | 137/615 |
| 1,901,660 | 5/1932 | Lund | 285/273 |
| 2,240,392 | 4/1941 | Dowell | 285/273 |
| 2,313,013 | 3/1943 | Gilli et al. | 141/279 |
| 2,727,534 | 12/1955 | Briede | 141/387 |
| 2,739,778 | 3/1956 | Krone et al. | 285/272 |
| 2,739,779 | 3/1956 | Krone et al. | 285/272 |
| 3,021,867 | 2/1962 | Gallagher | 137/615 |
| 3,176,730 | 4/1965 | Knight | 141/387 |
| 3,605,824 | 9/1971 | Madden et al. | 141/388 |
| 3,825,045 | 7/1974 | Bloomquist | 141/387 |
| 3,894,567 | 7/1975 | Mott et al. | 141/388 |
| 4,026,119 | 5/1977 | Dotti | 285/273 |

Primary Examiner—Martin P. Schwadron
Assistant Examiner—A. Michael Chambers
Attorney, Agent, or Firm—Phillips, Moore, Weissenberger, Lempio & Majestic

[57] ABSTRACT

An improvement in a fluid delivery apparatus which comprises a fluid input tube communicating via a flow through swivel joint with a fluid output tube which extends orthogonally of the input tube. The improvement comprises a pair of spaced apart bearings, each comprising an inner cylindrical bearing structure and an outer cylindrical structure. The outer cylindrical bearing structures are supported by the output tube and the inner cylindrical bearing structures are supported by the input tube. The bearings serve for taking up substantially the entire radial load created by the weight of the output tube thus protecting the swivel joint from such radial load.

13 Claims, 7 Drawing Figures

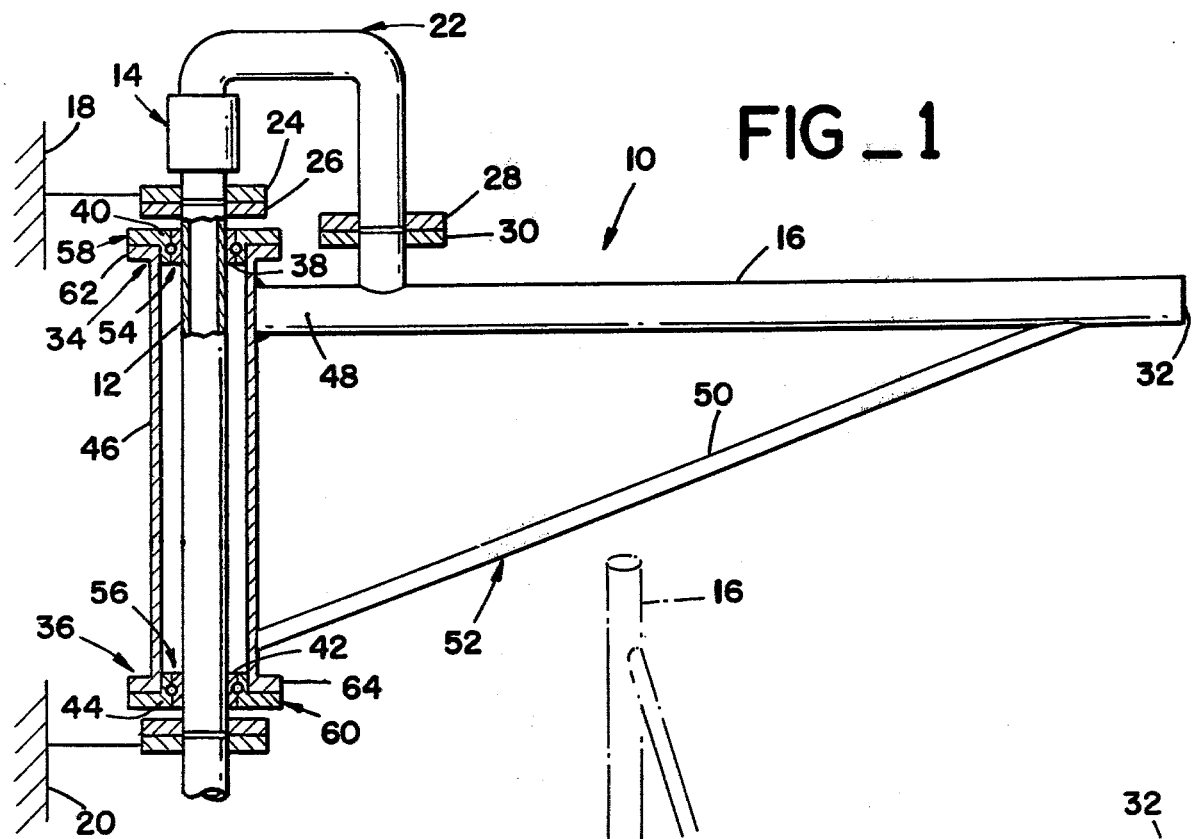
FIG_1
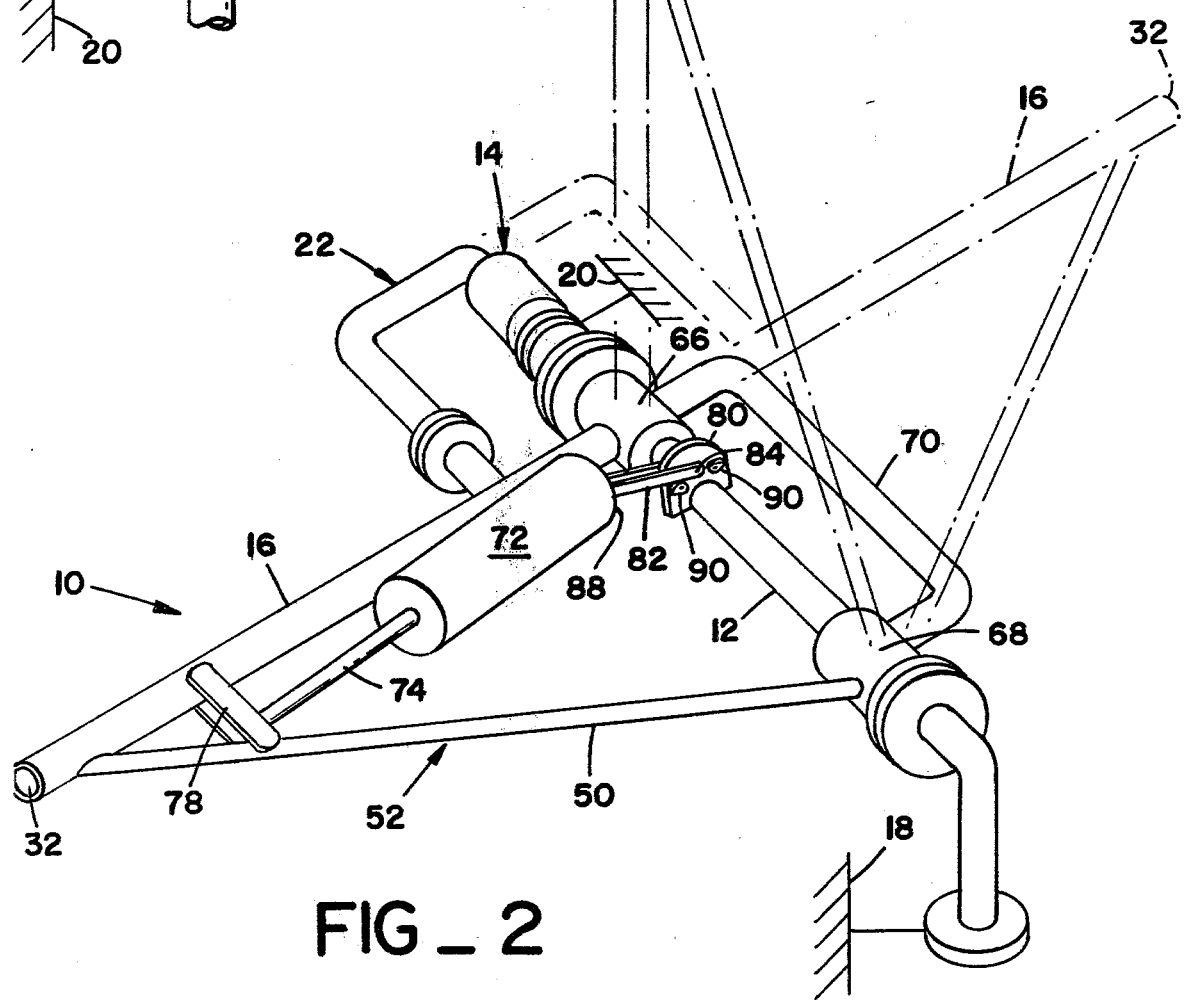
FIG_2

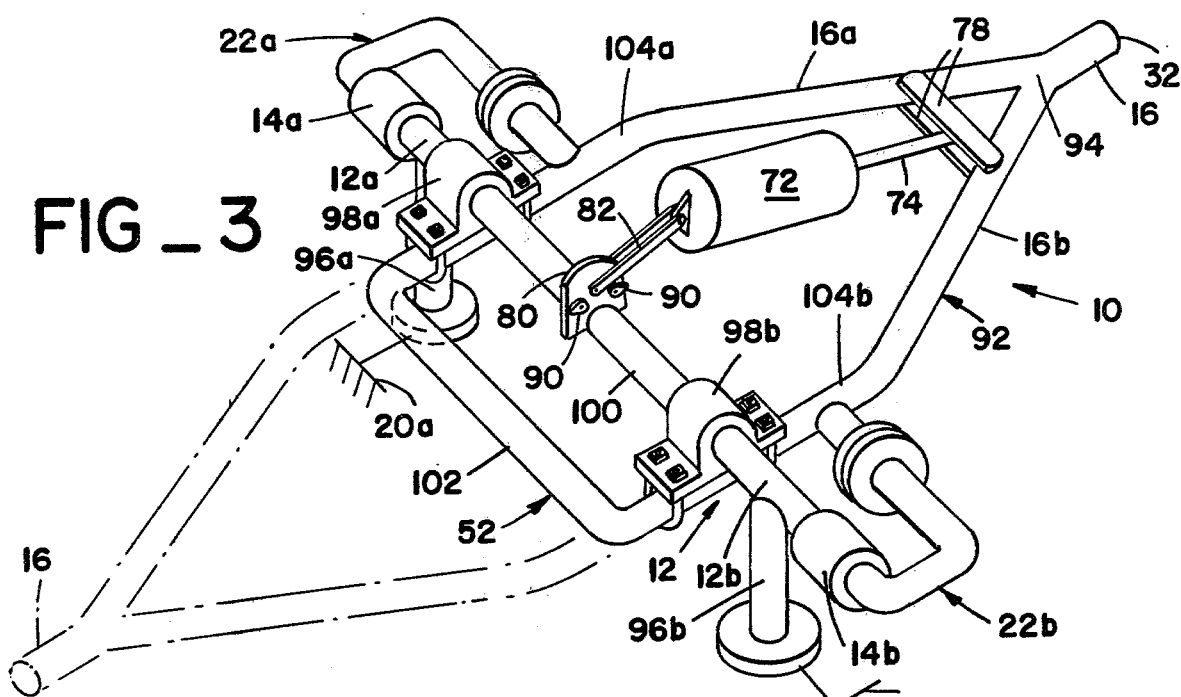
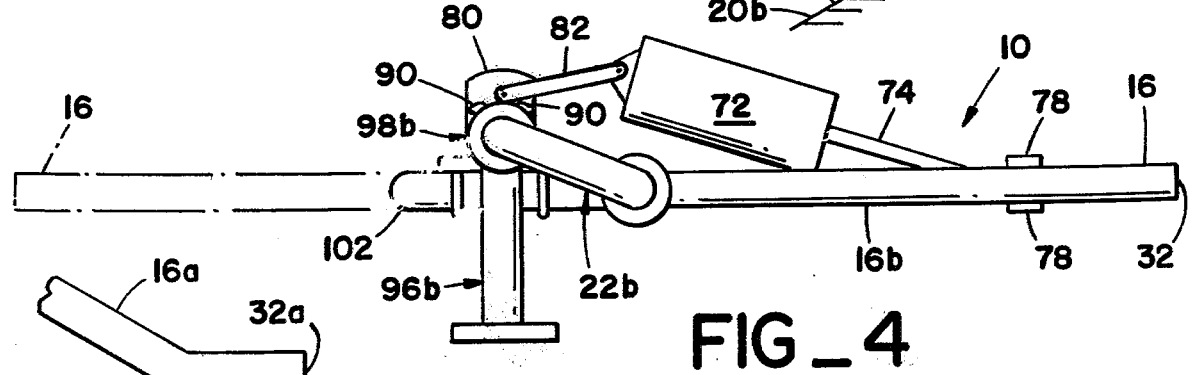
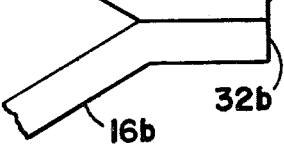
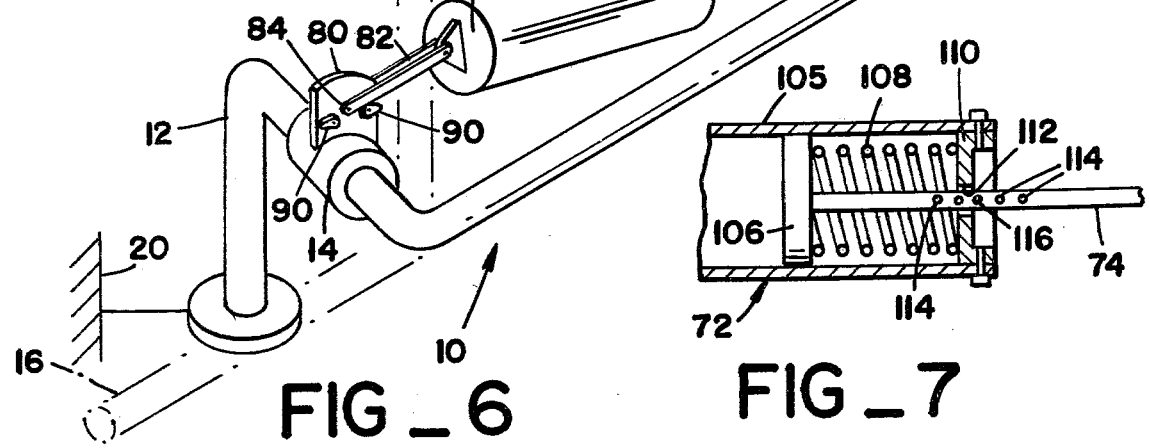

FLUID DELIVERY APPARATUS

BACKGROUND OF THE INVENTION

1. Field of the Invention

The invention relates to apparatus for delivering fluid flow via a swivel joint around substantially a right angle turn. Such apparatus is used in loading tank cars, ships, trucks and the like.

2. Prior Art

Flow through swivel joints are well known to the prior art and allow a fluid, for example a liquid, to be flowed from an input tube to an output tube. Such joints further permit the output tube to be swivelled relative to the input tube. Generally, such swivel joints have had to be fabricated to withstand significant radial loading due to the weight of the relatively heavy, and at times full, output tube which generally extends substantially orthogonally of the input tube. While some attempts have been made to partially alleviate this problem, for example, by utilizing a bar to form a triangular brace between the output tube and a vertical post which is pivotally mounted to a support platform, such solutions have been, at best, only partially effective since the swivel joint has still borne very significant radial loading. Also, such solutions have not been applied when the output tube is rotated in a vertical plane and the input tube is generally horizontal. As a result, it has been necessary to utilize swivel joints of quite rugged and expensive construction. And, even when utilizing such a rugged prior art swivel joint, it has been necessary to often replace or repair the joint and/or replace packing materials within the joint which are subjected to heavy loads due to the radial loading upon the swivel.

A further problem with prior art fluid delivery apparatus of the above described type occurs when the input tube is substantially horizontal and the output tube is made to rotate in a substantially vertical plane. This is necessary to facilitate hook up to mobile railcars, tanks, trucks, ships and the like. The filling nozzle elevations vary from one vehicle to the next, the vehicular suspension may settle as a fluid is loaded and in the case of ships tidal changes, listing, pitching and rolling can occur during a loading operation. In such usage, as the output tube rotates downwardly its center gravity shifts away from the input tube thus progressively increasing the radial force being exerted upon the swivel joint. This can lead to increased radial loading on the joint as the output tube approaches a horizontal position. Such force is even more greatly increased when the output tube reaches a generally horizontal position and fluid is pumped therethrough thus increasing its effective weight. Also, such forces are increased by valving, anti-pollution equipment, etc., which in some instances must be carried by the output tube. Manual elevation of such arms is exceedingly difficult and overhead pulleys, etc., are not always usable, and in any event generally requires overhead supports which are not always available.

Still further, removal of prior art swivel joints for repair and/or replacement is often difficult. With some prior art devices the swivel joints are only removable along with the output tube. This is clearly undesirable and increases downtime.

It is clear that solutions to either or both of the above problems would constitute a valuable contribution to the art.

SUMMARY OF THE INVENTION

The invention relates to an improvement in a fluid delivery apparatus which comprises a fluid input tube communicating via a flow through swivel joint with a fluid output tube which extends generally orthogonally of the input tube. The improvement comprises a pair of spaced apart bearing mean each comprising an inner cylindrical bearing structure and an outer cylindrical bearing structure. As a further part of the improvement means are provided for support of each of the outer cylindrical bearing structures by the output tube and each of the inner cylindrical bearing structures by the input tube.

In another sense the improvement relates to particular spring loaded counter-balancing means acting between the input tube and the output tube which provides a discontinuous increase in resistance to downward rotation of the output tube past a preselected elevation.

BRIEF DESCRIPTION OF THE DRAWINGS

The invention will be better understood by reference to the figures of the drawings wherein like numbers denote like parts throughout and wherein:

FIG. 1 illustrates a fluid delivery apparatus in accordance with the present invention with the input tube vertical and the output tube horizontal;

FIG. 2 illustrates, in perspective, an alternate embodiment of the present invention with the input tube horizontal and the output tube movable in a vertical plane and wherein a spring loaded counter-balance is utilized;

FIG. 3 illustrates, in perspective, an alternate embodiment of the present invention wherein the input tube is horizontal and the output tube is movable on a vertical plane;

FIG. 4 illustrates, in side elevation, another view of the embodiment of FIG. 3;

FIG. 5 illustrates in partial view a variation of the embodiment of FIGS. 3 and 4;

FIG. 6 illustrates an alternate embodiment which utilizes a particular advantageous spring loaded counter-balance in accordance with the present invention; and FIG. 7 illustrates in partial view in section, a detail in the structure of the spring loaded counter-balance.

DETAILED DESCRIPTION OF THE PREFERRED EMBODIMENTS

Adverting to FIG. 1 there is illustrated therein a fluid delivery apparatus 10 in accordance with the present invention which comprises a fluid input tube 12 communicating via a conventional flow through swivel joint 14 with a fluid output tube 16. In the particular embodiment illustrated in FIG. 1 the input tube 12 is generally vertically aligned and the output tube 16 is generally horizontally aligned and thus extends generally orthogonally to the input tube 12. The input tube 12 is affixed firmly in place as illustrated schematically at 18 and 20 so that it can bear the radial load created by the output tube 16 in a manner which will shortly become apparent.

The swivel joint 14 forms part of a generally U-shaped structure 22 having a flange 24 which attaches to a flange 26 on the input tube 12 and a flange 28 which attaches to a flange 30 on the output tube 16. It will be apparent that the U-shaped structure 22 can be easily removed for repair or replacement of the swivel joint 14 should such repair or replacement be needed. Fluid from a source not shown flows upwardly through the input tube 12 and thence through the U-shaped structure 22 to enter radially into the output tube 16 from which it flows via an orifice indicated at 32.

A pair of spaced apart bearing means 34 and 36 form an important part of the present invention. The bearing means 34 comprises an inner cylindrical bearing structure 38 and an outer cylindrical bearing structure 40. Similarly, the bearing means 36 comprises an inner cylindrical bearing structure 42 and an outer cylindrical bearing structure 44. The outer cylindrical bearing structures 40, 44 are affixed to the output tube 16 as by being formed or held within a bearing tube or sleeve 46 which coaxially surrounds the input tube 12 and which is affixed to an extension 48 of the output tube 16 and to a support rod 50 whereby the output tube 16, the support rod 50 and the bearing tube 46 form a triangular brace structure 52 which, in the usual manner for triangular bracing structures, provides fully braced support for the output tube 16. For example, common commercially available so-called "flange bearings" 54, 56 can be utilized for the bearing means 34 and 36 wherein the outer races 40, 44 are machined as part of a flange and the inner races corresponding with the inner cylindrical bearing structures 38 and 42 are respectively supported on the input tube 12 and are free to rotate inside of the respective flange bearings 54 and 56 of respective flanges 58 and 60. It will be noted that the flange 58 is attached to bearing tube or sleeve 46 and more particularly to a flange 62 extending from a first end thereof and that the flange 60 is attached to a flange 64 which is attached to the bearing tube or sleeve 46 adjacent a second end thereof. It will be apparent that in such an arrangement the bearing tube 46 is in the form of a relatively long sleeve and that the two bearing means 34 and 36 are significantly spaced apart and arranged in a manner to accept tha great majority of the radial loading created by the weight of the output tube 16. Thus, the swivel joint 14 is not significantly radially loaded.

ALTERNATE EMBODIMENT OF FIG. 2

Adverting now to FIG. 2 there is illustrated an alternate embodiment of the present invention which resembles the embodiment of FIG. 1. In the embodiment illustrated in FIG. 2, however, the input tube 12 is generally horizontal (rather than generally vertical as in FIG. 1) and the output tube 16 moves in generally a vertical plane as shown in phantom. When the apparatus 10 is used so as to have the output tube 16 rotatable in a vertical plane certain changes are desirably made. As illustrated in FIG. 2 the bearing tube or sleeve 46 is desirably replaced with a pair of relatively short collars 66 and 68 having bearing means as shown in FIG. 1 and being fastened together by a bridge 70 or the like. This allows a spring loaded counterbalance 72, which comprises compression spring means, to be attached to act between the input tube 12 and the output tube 16 in a manner which opposes downward rotation of the output tube 16. The spring loaded counter-balance 72 biases the output tube 16 into a vertical position. Briefly, the spring loaded counterbalance 72 comprises compression spring means which will be described below in detail. The spring loaded counterbalance 72 is connected to the output tube 16 via a rod 74 and a bracket 78 which is normally welded to the output tube 16 and may be further welded to the support rod 50. A post 80 is attached to the input tube 12 and extends upwardly therefrom. A link 82 is pivotally mounted at 84 centrally on the post 80. The link 82 is also pivotally mounted to a first end 88 of the spring loaded counterbalance 72. Stop means, in the form of a pair of small posts 90, extend from the post 80 in position for stopping the link 82 from pivoting about the post central pivot 84 when the output tube 16 is rotated downwardly in a clockwise or counterclockwise direction past a preselected elevation which is selected by the location of the small posts 90. The small posts 90 can be eccentrically shaped and pivotally adjustably attached to the post 80 to provide operator control of the preselected elevation. A discontinuous increase in resistance to downward rotation of the output tube 16 past the preselected elevation results since a lever arm through which the spring loaded counterbalance 72 acts upon the input tube 12 is suddenly and discontinuously varied at this preselected elevation. What results is greatly increased spring loading for the last bit of lowering of the output tube 16, namely just when the center of gravity thereof is furthest removed from the input tube 12. Since the smaller lever arm is used when the input tube 12 is closer to the vertical, it follows that it can be lowered relatively rapidly during its initial lowering phase.

EMBODIMENT OF FIGS. 3 and 4

Referring now to FIGS. 3 and 4, there is illustrated another embodiment wherein the input tube 12 is generally horizontal and the output tube 16 moves in a generally vertical plane. In the embodiment of FIGS. 3 and 4 the fluid output tube 16 is in the form of a generally V-shaped tubular structure 92 and comprises a first leg 16a and a second leg 16b which join together to form the tube 16 leading to the orifice 32, which orifice communicates with an apex 94 of the V-shaped tubular structure 92. Swivel joints 14a and 14b are attached adjacent and in flow communication with the first leg 16a and the second leg 16b of the V-shaped structure 92. Attachment is via generally U-shaped structures 22a and 22b. In the embodiment of FIGS. 3 and 4 there is provided a pair of input side-tubes 96a and 96b which communicate with the input tube 12a, 12b adjacent the respective U-shaped structues 22a, 22b. In this manner two different fluids can be pumped into the same delivery apparatus, or, alternatively, the same apparatus can be used to load first one and then another liquid; for example, one liquid or other fluid can be loaded via input side-tube 96a and then thereafter another fluid can be loaded via input side tube 96b.

The output tube 16a, 16b is pivotally attached at respective bearings 98a and 98b for rotation about an extension 100 which communicates the input tube 12a, 12b. It is noted that the extension 100 can be either flow blocking or can be a tube itself thus allowing flow therethrough. The bearings 98a and 98b are fixedly attached to a bridge 102 which communicates the base ends 104a and 104b of the V-shaped tubular structure 92 to form a triangular brace structure 52. It will be noted that great rigidity results for the entire structure while radial loads upon the swivel joints 14a and 14b are substantially completely eliminated.

It will be noted that the spring loaded counterbalance 72 will normally be used in this embodiment for the same reason as it is used in the embodiment of FIG. 2.

EMBODIMENT OF FIG. 5

The embodiment of FIG. 5 is identical to that of FIGS. 3 and 4 with the exception that the legs 16 and 16b do not combine but instead lead to separate orifices 32a and 32b. This structural change allows alternate loading of incompatible materials into different tank cars or the like without changing or cleaning the fluid delivery apparatus 10. This structural change also allows one of the legs, e.g., 16a, to be used for delivering a toxic or polluting material, which the other of the legs, 16b, is connected to a vacuum source and appropriate apparatus for trapping escaping toxic or polluting vapors.

EMBODIMENT OF FIGS. 6 and 7

Referring now to FIGS. 6 and 7, there is illustrated therein a somewhat simplified embodiment of the invention wherein the input tube 12 is generally horizontal and the output tube 16 is generally movable in a vertical plane and wherein the swivel joint 14 has directly attached thereto the post 80 having the small posts 90 as a part thereof. It will be noted that the spring loaded counterbalance 72 is illustrated in detail in these figures. The counterbalance 72 comprises a cannister 105 and that the link 82 serves as means for attaching the first end 88 of the cannister 105 to the input tube 12, in the embodiment illustrated in FIGS. 6 and 7 via the post 80 which is attached to the swivel joint 14 which is in turn rigidly attached to the input tube 12. It is noted in this respect that the output tube 16 rotates within the swivel joint 14 in the usual manner for such joints. A shoe 106 fits within the cannister 105 and holds a compression spring 108 against a second end 110 of the cannister 105. The rod 74 is connected to the shoe 106 and passes through an opening 112 in the second end 110 of the cannister 105. The rod 74, as previously mentioned, is attached via brackets 78 to the output tube 16. A plurality of holes 114 are provided in the rod 74 along with a pin 116 which is sized to fit in any one of the holes 114. This serves as holding or detent means for fastening the rods 74 in a selected position of withdrawal from the cannister 105. Thus, for example, the rod 74 can be pulled outwardly of the second end 110 of the cannister 105 sufficiently to significantly compress the spring 108 and then can be fastened in that outward location by sliding the pin 116 into the appropriate one of the holes 114. After this is accomplished the bracket 78 can be welded to the output tube 16 with the output tube 16 in its horizontal position to allow easy installation on existing equipment. It will also be noted by reference not only to FIGS. 6 and 7 but also to FIGS. 2, 3, 4 and 5, that the output tube 16 can be rotated either clockwise or counterclockwise in a vertical plane and that in either direction the link 82 will contact one of the small posts 90 which will serve as stop means therefor whereby there will be a discontinuous increase in resistance to further downward rotation of the output tube 16 starting as soon as the link 82 contacts one of the small posts 90.

It will be noted that through operating in accordance with any of the embodiments of the present invention that one or more of the aforesetout problems of the prior art fluid delivery apparatus is eliminated. Radial loading on the swivel joints is substantially completely eliminated in the embodiments of FIGS. 1–5 and a discontinuous increase in resistance to downward rotation of an output tube within a vertical plane past a preselected elevation is provided in each of the embodiments of FIGS. 2–7.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. In a fluid delivery apparatus which comprises fluid input tube means communicating via flow through swivel joint means with fluid output tube means which extends generally orthogonally of said input tube, an improvement comprising:
   a pair of spaced apart bearing means, each comprising an inner cylindrical bearing structure and an outer cylindrical bearing structure;
   means for supporting each of said outer cylindrical bearing structures on said output tube means; and
   means for supporting each of said inner cylindrical bearing structures on said input tube means.

2. An improvement as in claim 1, wherein said outer cylindrical bearing structures supporting means comprises a sleeve coaxially positioned about said input tube means.

3. An improvement as in claim 1, wherein said outer cylindrical bearing structures comprise a pair of spaced apart bearings and said input tube means is generally horizontal and including:
   compression spring means and attaching means acting between said input tube means and said output tube means for opposing downward rotation of said output tube means.

4. An improvement as in claim 3, wherein said fluid output tube means comprises a generally V-shaped tubular structure having a pair of tubular legs meeting at an apex, with an output orifice of said generally V-shaped tubular structure adjacent said apex thereof, said swivel joint means is attached adjacent and in flow communication with a first of the tubular legs of said V-shaped structure, and including;
   additional swivel joint means attached adjacent and in flow communication with a second of the tubular legs of said V-shaped structure.

5. An improvement as in claim 4, including:
   a pair of input side-tubes, each communicating with said input tube means and each of a respective one of said pair of tubular legs.

6. An improvement as in claim 3, wherein said compression spring means comprises:
   a cannister;
   means for attaching a first end of said cannister to said input tube means;
   a shoe within said cannister;
   a compression spring between said shoe and a second end of said cannister;
   a rod connected to said shoe and passing through said second end of said cannister; and
   means for attaching said rod to said output tube means.

7. An improvement as in claim 6, wherein said cannister first end attaching means comprises:

a post extending upwardly from said input tube means;

a link including means pivotally mounting said link centrally on said post and pivotally mounting said link to said cannister first end; and stop means extending from said post for stopping said link from pivotting about said post pivot when said output tube means is rotated downwardly past a preselected elevation to provide a discontinuous increase in resistance to downward rotation of said output tube means past said preselected elevation.

8. An improvement as in claim 7, including:

detent means for fastening said rod in a selected position of withdrawl from said cannister.

9. An improvement as in claim 1, including: means for attaching the swivel joint to the input tube means at a portion thereof external of the pair of bearing means.

10. An improvement as in claim 9, including; means for preventing said input tube means from rotating.

11. An improvement as in claim 1, further including: means for mounting said pair of bearing means generally coaxial with said swivel joint means and a longitudinally spaced distance apart from one end thereof.

12. In a fluid delivery apparatus which comprises generally horizontal input tube means communicating via flow through swivel joint means with fluid output tube means which extends generally orthogonally of said input tube means, an improvement comprising:

a post extending upwardly from said input tube means;

a cannister;

a link including means pivotally mounting said link centrally on said post and pivotally mounting said link to a first end of said cannister;

a shoe within said cannister;

a compression spring between said shoe and a second end of said cannister;

a rod connected to said shoe and passing through said second end of said cannisters;

means for attaching said rod to said output tube means; and stop means extending from said post for stopping said link from pivotting about said post pivot when said output tube means is rotated downwardly past a preselected elevation to provide a discontinuous increase in resistance to downward rotation of said output tube means past said preselected elevation.

13. An improvement as in claim 12, including:

detent means for fastening said rod in a selected position of withdrawal from said cannister.

* * * * *